Nov. 11, 1924.
F. W. SCHOTT
1,514,994
ANIMAL TRAP
Filed Aug. 10, 1923
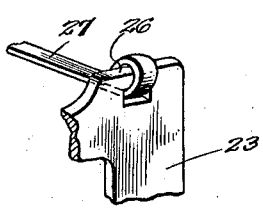
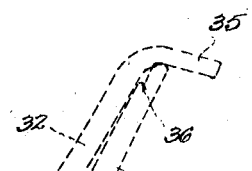
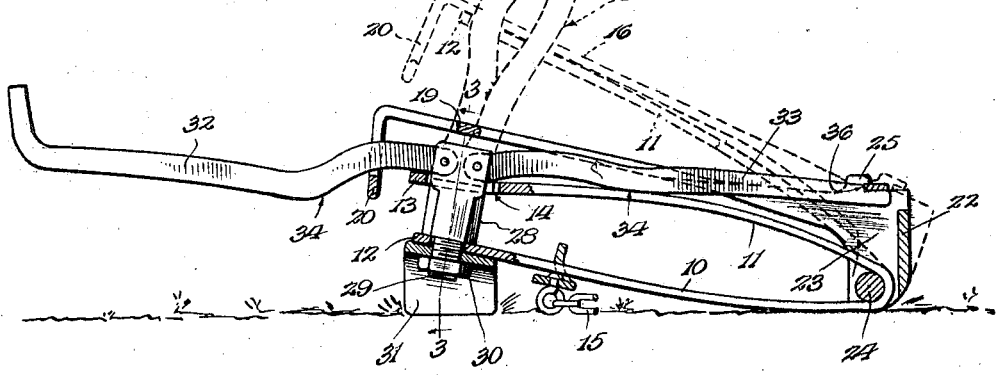
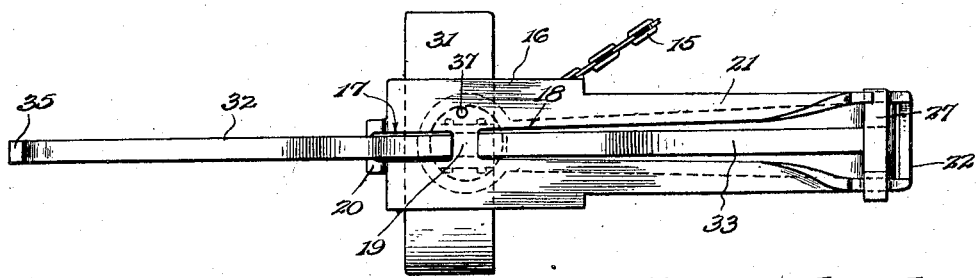
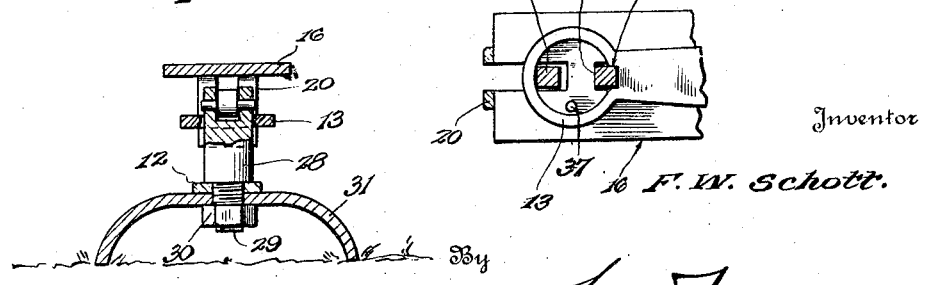
Inventor
F. W. Schott.

Patented Nov. 11, 1924.

1,514,994

UNITED STATES PATENT OFFICE.

FREDRICK W. SCHOTT, OF LOLO HOT SPRINGS, MONTANA.

ANIMAL TRAP.

Application filed August 10, 1923. Serial No. 656,659.

*To all whom it may concern:*

Be it known that I, FREDRICK W. SCHOTT, a citizen of the United States, residing at Lolo Hot Springs, in the county of Missoula and State of Montana, have invented certain new and useful Improvements in Animal Traps, of which the following is a specification.

This invention relates to an improved animal trap and seeks, among other objects, to provide a device of this character which will be quick-acting and powerful, which may be readily sprung, and which may be readily set and concealed.

The invention seeks, as a further object, to provide a trap embodying a bowed leaf spring having companion spring arms and wherein the entire mechanism of the trap will be assembled upon the spring.

Another object of the invention is to provide a trap employing a pair of jaws movable in the plane of the trap spring and also employing a treadle to overlie the spring receiving the jaws therethrough and wherein the treadle will serve to brace and guide the jaws.

And the invention seeks, as a still further object, to provide a trap which will be simple in its construction and which, without departing from the spirit of the invention, may be readily varied in design or proportions to suit the requirements incident to catching different game.

Other and incidental objects will appear hereinafter.

In the drawings:

Figure 1 is a longitudinal sectional view through my improved trap, showing the trap set, and illustrating in dotted lines, the position of the parts when the trap is sprung, Figure 2 is a top plan view of the device, Figure 3 is a vertical sectional view on the line 3—3 of Figure 1, Figure 4 is a horizontal sectional view looking at the inner side of the upper spring arm of the trap when the trap is sprung, and Figure 5 is a detail perspective view showing the mounting of the latch of the trap.

In carrying the invention into effect, I employ a bowed leaf spring embodying companion spring arms 10 and 11 provided at their free ends with eyes 12 and 13, the latter of which is formed at its rear side with a notch 14, and connected with the arm 10 is an appropriate securing chain 15 for the trap. Overlying the spring is a treadle 16 widened at its forward end and provided with slots 17 and 18 at the confronting ends of which is defined a cross web 19 connecting the portions of the treadle at opposite sides of said slots, and formed on the treadle at its forward end is a depending U-shaped guide member 20 providing a continuation of the slot 17. At its rear end, the treadle is continued to define spaced shanks 21 lying at opposite sides of the slot 18 and formed on said shanks at the rear end of the treadle is a channel-shaped head 22 extending at substantially a right angle to the length of the treadle and provided with side flanges 23 freely straddling the rear end of the trap spring. Extending between said side flanges at their lower ends in the crotch between the spring arms 10 and 11 is a rivet or cross pin 24 pivotally connecting the treadle with the spring. At their upper ends, the flanges 23 are, as best brought out in Figures 1 and 5, formed one with a rearwardly directed hook 25 and the other with an opening to define a pintle 26, and looped at one end around said pintle is a latch 27 mounted to cant upon the pintle as well as pivotally movable thereon, the latch being engageable at its free end beneath the hook 25.

Mounted upon the arm 10 of the trap spring is an upstanding yoke 28 provided at its lower end with a reduced stud 29 extending freely through the eye 12 of said arm to receive a nut 30 and clamped beneath said nut is a longitudinally bowed foot plate 31 adapted to engage the ground for supporting the trap in upright position. The yoke 28 is adapted to be freely received through the eye 13 of the spring arm 11 and pivotally mounted at their lower ends upon said yoke are companion jaws 32 and 33 received through the slots 17 and 18 of the treadle, the jaws being thus mounted for movement in the plane of the treadle and of the trap spring. Near their inner ends, the jaws are formed with oppositely bowed portions 34 and formed on the jaw 32 at its outer end is a toe 35 adapted to overhang the outer end of the jaw 33 when the jaws are closed so that an animal cannot slip from between the jaws at their outer ends. At its outer end portion, the jaw 33 is cut away at its inner side to form a shoulder 36 near the outer terminal of the jaw.

To set the trap, the jaws 32 and 33 are, as best shown in Figure 1, swung apart to occupy a substantially alined position, when the latch 27 is arranged to extend over the outer end of the jaw 33 in front of the shoulder 36 and is engaged beneath the hook 25, the treadle 16 being elevated at its forward end with respect to the free end of the spring arm 11. The latch will then function to hold the trap set. Assuming now that the free end of the treadle is depressed, it will be seen that the treadle will swing about the axis of the cross pin 24 and thus tend to carry the latch forwardly. However, forward movement of the latch will be prevented by the shoulder 36 with the result that as the treadle is swung, the hook 25 will be carried forwardly toward disengagement from the latch while the latch will be canted by the shoulder 36 rearwardly upon its pintle 26 out of engagement with the hook. Extreme sensitiveness of the trap is thus obtained in responding to the movement of the treadle so that but slight pressure upon the treadle as well as slight movement thereof is required to spring the trap. When the trap is sprung, the arms 10 and 11 of the trap spring will, of course, immediately move away from each other so that the eye 13 of the spring arm 11 will be shifted upwardly along the jaws 32 and 33 for closing the jaws, the bowed portions 34 of the jaws providing inclined faces against which the eye may act for accelerating the movement of the jaws as well as wedging the jaws toward closed position. As will be noted, the notch 14 of the eye 13 is provided to receive the jaw 33 when the trap is sprung while the treadle 16 straddles the jaws bracing and supporting the jaws against lateral movement with respect to each other. Furthermore, the treadle will serve to guide the jaws toward closed position while, when the trap is being set and the treadle is depressed, the web 19 thereof will assist in swinging the jaws apart. Formed in the treadle is an opening 37 so that a string may be attached to the treadle and arranged to extend downwardly therebeneath through the eye 13 of the spring arm 10 and then laterally to carry a bait. In some instances it may prove desirable to thus set the trap with a bait but ordinarily the string and bait are not employed.

Having thus described the invention, what is claimed as new is:

1. A trap including a spring arm, companion jaws operable thereby, a pivoted treadle, a latch carried by the treadle in spaced relation to the pivotal center thereof for engagement with one of said jaws holding the trap set, and means carried by said jaw limiting the latch against movement with the treadle about said center.

2. A trap including a spring arm, companion jaws operable thereby, a pivoted treadle, a latch carried by the treadle in spaced relation to the pivotal center thereof to extend across one of said jaws holding the trap set, and means carried by said jaw limiting the latch against movement with the treadle about said center.

3. A trap including a spring arm, companion jaws operable thereby, a pivoted treadle, a latch carried by the treadle in spaced relation to the pivotal center thereof, and a hook upon the treadle to engage the free end of the latch retaining the latch to extend across one of said jaws holding the trap set.

4. A trap including a spring arm, companion jaws operable thereby, a pivoted treadle, a latch carried by the treadle in spaced relation to the pivotal center thereof, a hook upon the treadle to engage the free end of the latch retaining the latch to extend across one of said jaws holding the trap set, and a shoulder upon said jaw limiting the latch against movement with the treadle about said center whereby when the treadle is depressed, the hook will be moved relative to the latch while the latch will be canted by said jaw relative to the hook for releasing the latch.

5. A trap including a spring arm, companion jaws operable thereby, a pivoted treadle extending longitudinally of said arm straddling the jaws, and a latch carried by the treadle to engage one of said jaws holding the trap set.

6. A trap including a spring having companion spring arms, companion pivoted jaws carried by one of said arms and operable by the other of said arms, a treadle pivotally connected with the spring to overlie said spring receiving the jaws therethrough, and a latch carried by the treadle to engage one of said jaws holding the trap set.

7. A trap including a spring arm, coacting jaws actuated thereby, a pivoted treadle, and a latch carried by the treadle to extend transversely of the plane of movement thereof engaged with one of said jaws for holding the trap set, the latch being movable relative to the treadle.

8. A trap including a spring arm, coacting jaws actuated thereby, a pivoted treadle, and a latch carried by the treadle in spaced relation to the pivotal center thereof to extend at an angle to the plane of movement of the treadle for engagement with one of said jaws holding the trap set, the latch being movable relative to the treadle.

9. A trap including a spring arm, coacting jaws actuated thereby, a pivoted treadle extending longitudinally of said arm and accommodating the jaws through an opening in the treadle, and a latch associated with the treadle to extend at an angle to the plane of movement thereof engaged with one of said jaws for holding the trap set.

10. A trap including a spring arm, coacting jaws actuated thereby, a pivoted treadle, a latch carried by the treadle in spaced relation to the pivotal center thereof to extend at an angle to the plane of movement of the treadle for engagement with one of said jaws holding the trap set, and a shoulder carried by said jaw for limiting the latch against movement with the treadle about said center.

In testimony whereof I affix my signature.

FREDRICK W. SCHOTT.